United States Patent
Zhang et al.

(10) Patent No.: US 10,419,111 B2
(45) Date of Patent: Sep. 17, 2019

(54) DATA TRANSMISSION METHOD AND APPARATUS

(71) Applicant: HUAWEI TECHNOLOGIES CO., LTD., Shenzhen, Guangdong (CN)

(72) Inventors: Xiaofeng Zhang, Shenzhen (CN); Lei Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/923,020

(22) Filed: Mar. 16, 2018

(65) Prior Publication Data
US 2018/0205456 A1 Jul. 19, 2018

Related U.S. Application Data

(63) Continuation of application No. PCT/CN2015/090025, filed on Sep. 18, 2015.

(51) Int. Cl.
*H04B 10/079* (2013.01)
*H04B 10/2575* (2013.01)
(Continued)

(52) U.S. Cl.
CPC ... *H04B 10/07953* (2013.01); *H04B 10/2575* (2013.01); *H04B 10/516* (2013.01);
(Continued)

(58) Field of Classification Search
CPC ............ H04B 10/07953; H04B 10/516; H04B 10/2575; H04J 13/18; H04J 14/005; H04L 5/0048; H04L 27/26; H04W 88/08
(Continued)

(56) References Cited

U.S. PATENT DOCUMENTS 9,654,245 B2  5/2017 Fang et al.
2004/0151503 A1  8/2004 Kashima et al.
(Continued)

FOREIGN PATENT DOCUMENTS

CN  101321017 A  12/2008
CN  103428144 A  12/2013
(Continued)

OTHER PUBLICATIONS

International Search Report issued in International Application No. PCT/CN2015/090025 dated Jun. 1, 2016, 82 pages.
(Continued)

*Primary Examiner* — Juan A Torres
(74) *Attorney, Agent, or Firm* — Fish & Richardson P.C.

(57) ABSTRACT

The present disclosure provides example data transmission methods and apparatuses. One example method includes obtaining a radio signal by using an input port. Based on a correspondence between an input port and a bearer channel, a bearer channel corresponding to the radio signal is determined. Code Division Multiple Access (CDMA) modulation and carrier modulation on the radio signal are performed according to a codeword and a frequency sub-band corresponding to the bearer channel, to obtain a modulated electrical signal. The modulated electrical signal is then modulated to an optical wavelength corresponding to the bearer channel to obtain a modulated optical signal, and the modulated optical signal is sent to an optical network.

17 Claims, 5 Drawing Sheets

(51) Int. Cl.
  *H04L 27/26* (2006.01)
  *H04W 88/08* (2009.01)
  *H04B 10/516* (2013.01)
  *H04J 13/18* (2011.01)
  *H04J 14/00* (2006.01)
  *H04L 5/00* (2006.01)

(52) U.S. Cl.
  CPC ............ *H04J 13/18* (2013.01); *H04J 14/005* (2013.01); *H04L 5/0048* (2013.01); *H04L 27/26* (2013.01); *H04W 88/08* (2013.01)

(58) Field of Classification Search
  USPC .......................................................... 398/26
  See application file for complete search history.

(56) References Cited

U.S. PATENT DOCUMENTS

| | | | |
|---|---|---|---|
| 2008/0063397 A1 | 3/2008 | Hu et al. | |
| 2010/0086304 A1 | 4/2010 | Mizutani et al. | |
| 2010/0158527 A1 | 6/2010 | Mizutani et al. | |
| 2010/0296469 A1* | 11/2010 | Zhou | H04W 28/02 370/329 |
| 2012/0045211 A1* | 2/2012 | Tan | H04B 10/25759 398/66 |
| 2014/0072298 A1* | 3/2014 | Hou | H04B 10/0773 398/16 |
| 2014/0301734 A1 | 10/2014 | Fang | |
| 2014/0308899 A1 | 10/2014 | Chen et al. | |
| 2016/0309465 A1* | 10/2016 | Padfield | H04B 10/25758 |

FOREIGN PATENT DOCUMENTS

| | | |
|---|---|---|
| CN | 103905122 A | 7/2014 |
| CN | 104104406 A | 10/2014 |

OTHER PUBLICATIONS

Youngju Kim et al:"An Adaptive Time, Frequency and Code Allocation for MC-CDMA Systems", Commonications, 2006. ICC'06. IEEE International Conference on, IEEE, PI, Jun. 1, 2006, pp. 4369-4372, XP031025595.

Extended European Search Report issued in European Application No. 15903895.9 dated Aug. 18, 2016, 9 pages.

* cited by examiner

DATA TRANSMISSION METHOD AND APPARATUS

CROSS-REFERENCE TO RELATED APPLICATION

This application is a continuation of International Patent Application No. PCT/CN2015/090025, filed on Sep. 18, 2015, the disclosure of which is hereby incorporated by reference in its entirety.

TECHNICAL FIELD

The present invention relates to the field of communications technologies, and in particular, to a data transmission method and apparatus.

BACKGROUND

With development of wireless technologies, a remote radio unit (RRU) and a baseband unit (BBU) that are originally located on a same base station are separated from each other. Coverage of the RRU becomes smaller, and the RRU logically approaches a user. BBUs are pooled and virtualized, and are deployed together. A fronthaul (Fronthaul) manner is used on an RRU side and a BBU side.

Referring to FIG. 1, FIG. 1 is a structural diagram and a schematic diagram of deployment of a wireless network in the prior art. As shown in FIG. 1, each station includes only an RRU device, and all BBU devices move up to a centralized equipment room to form a BBU pool. A BBU and an RRU are connected by using a common public radio interface (CPRI) and an optical fiber. The BBU and the RRU transmit data to each other over the optical fiber by using a CPRI transfer protocol. Specifically, when the BBU or the RRU needs to transmit a radio signal, the BBU or the RRU encapsulates the radio signal in a CPRI protocol frame format, and transmits the encapsulated radio signal by using the CPRI interface and the optical fiber.

The foregoing network structure has the following disadvantages: Because the radio signal needs to be encapsulated according to the CPRI protocol, there is a relatively large amount of invalid data, and transmission efficiency is relatively low. In addition, a large quantity of optical fibers need to be deployed between the BBU and the RRU in the transmission manner.

SUMMARY

Embodiments of the present invention provide a data transmission method and apparatus, so as to resolve a prior-art technical problem that transmission efficiency is relatively low in a manner of data transmission between a BBU and an RRU.

A first aspect of the present invention provides a data transmission method, including:

obtaining a radio signal by using an input port;

determining, according to a correspondence between an input port and a bearer channel, a bearer channel corresponding to the radio signal;

performing Code Division Multiple Access (CDMA) modulation and carrier modulation on the radio signal according to a codeword and a frequency sub-band that are corresponding to the bearer channel, to obtain a modulated electrical signal; and modulating the modulated electrical signal to an optical wavelength corresponding to the bearer channel, to obtain a modulated optical signal; and sending the modulated optical signal to an optical network.

With reference to the first aspect, in a first possible implementation of the first aspect, the method further includes:

measuring a channel, to obtain information indicating how a signal-to-noise ratio SNR changes with a frequency spectrum;

determining at least one bearer channel according to the information indicating how the SNR changes with the frequency spectrum; and establishing the correspondence between an input port and a bearer channel.

With reference to the first aspect, in a second possible implementation of the first aspect, the method further includes:

determining at least one bearer channel according to a configured type of a radio signal, a configured quantity of each type of radio signals, and a configured channel capacity requirement of each type of radio signals; and establishing the correspondence between an input port and a bearer channel.

With reference to the first possible implementation of the first aspect, in a third possible implementation of the first aspect, the measuring a channel includes:

sending a reference signal;

receiving, by using a management channel, a measurement result generated based on the reference signal, where a codeword and a carrier that are used for the management channel are fixed; and determining, according to the measurement result, the information indicating how the SNR changes with the frequency spectrum.

With reference to the first aspect, or the first possible implementation of the first aspect, or the second possible implementation of the first aspect, in a fourth possible implementation of the first aspect, the method further includes:

sending the correspondence to a receive end by using a management channel, so that the receive end demodulates the modulated optical signal according to the correspondence, where a codeword and a carrier that are used for the management channel are fixed.

With reference to the first aspect, in a fifth possible implementation of the first aspect, the method further includes:

receiving the correspondence by using a management channel, where a codeword and a carrier that are used for the management channel are fixed.

A second aspect of the present invention provides a network side device, including:

an input port, configured to receive a radio signal;

a processor, configured to determine, according to a correspondence between an input port and a bearer channel, a bearer channel corresponding to the radio signal;

a modem, configured to: perform Code Division Multiple Access CDMA modulation and carrier modulation on the radio signal according to a codeword and a frequency sub-band that are corresponding to the bearer channel, to obtain a modulated electrical signal; and modulate the modulated electrical signal to an optical wavelength corresponding to the bearer channel, to obtain a modulated optical signal, where the optical wavelength is an optical wavelength supported by an optical network that connects the network side device and a receive end device; and an optical transceiver, configured to send the modulated optical signal to the optical network.

With reference to the second aspect, in a first possible implementation of the second aspect, the processor is further configured to: obtain a measurement result of a channel, where the measurement result includes information indicating how a signal-to-noise ratio SNR changes with a frequency spectrum; determine at least one bearer channel according to the information indicating how the SNR changes with the frequency spectrum; and establish the correspondence between an input port and a bearer channel.

With reference to the second aspect, in a second possible implementation of the second aspect, the processor is further configured to: determine at least one bearer channel according to a configured type of a radio signal, a configured quantity of each type of radio signals, and a configured channel capacity requirement of each type of radio signals; and establish the correspondence between an input port and a bearer channel.

With reference to the first possible implementation of the second aspect, in a third possible implementation of the second aspect, the optical transceiver is further configured to: send a reference signal to the receive end device; and receive, by using a management channel, a measurement result generated based on the reference signal, where a codeword and a carrier that are used for the management channel are fixed; and the processor is configured to obtain, according to the measurement result, the information indicating how the SNR changes with the frequency spectrum.

With reference to the second aspect, or the first possible implementation of the second aspect, or the second possible implementation of the second aspect, in a fourth possible implementation of the second aspect, the optical transceiver is further configured to send the correspondence to the receive end device by using a management channel, so that the receive end device demodulates the modulated optical signal according to the correspondence, where a codeword and a carrier that are used for the management channel are fixed.

With reference to the second aspect, in a fifth possible implementation of the second aspect, the optical transceiver is further configured to receive the correspondence by using a management channel, where a codeword and a carrier that are used for the management channel are fixed.

With reference to any one of the second aspect, or the first to the fifth possible implementations of the second aspect, in a sixth possible implementation of the second aspect, the network side device is a baseband unit (BBU) side device, and the receive end device is a remote radio unit (RRU) side device; or the network side device is a remote radio unit RRU side device, and the receive end device is a baseband unit BBU side device.

A third aspect of the present invention provides a data transmission apparatus, including:

a processing unit, configured to: obtain a radio signal by using an input port; determine, according to a correspondence between an input port and a bearer channel, a bearer channel corresponding to the radio signal; and perform Code Division Multiple Access CDMA modulation and carrier modulation on the radio signal according to a codeword and a frequency sub-band that are corresponding to the bearer channel, to obtain a modulated electrical signal; and modulate the modulated electrical signal to an optical wavelength corresponding to the bearer channel, to obtain a modulated optical signal; and an optical sending unit, configured to send the modulated optical signal to an optical network.

One or more technical solutions provided in the embodiments of the present invention have at least the following technical effects or advantages:

In the embodiments of the present invention, each input port is corresponding to one bearer channel, and each bearer channel includes three attributes: a codeword used for each bearer channel, a frequency sub-band of each bearer channel, and an optical wavelength of each bearer channel. Then different-codewords-based CDMA modulation and different carrier modulation are performed on each radio signal, to obtain a modulated electrical signal, and then the modulated electrical signal is modulated to an optical wavelength supported by an optical network, to obtain a modulated optical signal. Because there is no need to encapsulate the radio signal, and an amount of to-be-transmitted invalid data is reduced, system transmission efficiency is improved. Further, because radio signals are distinguished from each other by using codewords and/or carriers, one separate optical fiber is optional between an RRU and a BBU, on the premise that at least only one optical fiber is required in an entire network. Therefore, a quantity of deployed optical fibers between a BBU side and an RRU side can be greatly reduced.

DESCRIPTION OF EMBODIMENTS

Embodiments of the present invention provide a data transmission method and apparatus, so as to resolve a prior-art technical problem that a large quantity of optical fibers need to be deployed in a manner of data transmission between a BBU and an RRU.

To resolve the foregoing technical problem, a main idea of technical solutions in the embodiments of the present invention is as follows:

Each input port is corresponding to one bearer channel, and each bearer channel includes three attributes: a codeword used for each bearer channel, a frequency sub-band of each bearer channel, and an optical wavelength of each bearer channel. Then different-codewords-based CDMA modulation and different carrier modulation are performed on each radio signal, to obtain a modulated electrical signal, and then the modulated electrical signal is modulated to an optical wavelength supported by an optical network, to obtain a modulated optical signal. Because there is no need to encapsulate the radio signal, and an amount of to-be-transmitted invalid data is reduced, system transmission efficiency is improved. Further, because radio signals are distinguished from each other by using codewords and/or carriers, one separate optical fiber is optional between an RRU and a BBU, on the premise that at least only one optical fiber is required in an entire network. Therefore, a quantity of deployed optical fibers between a BBU side and an RRU side can be greatly reduced.

To make the objectives, technical solutions, and advantages of the embodiments of the present invention clearer, the following clearly and describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1:
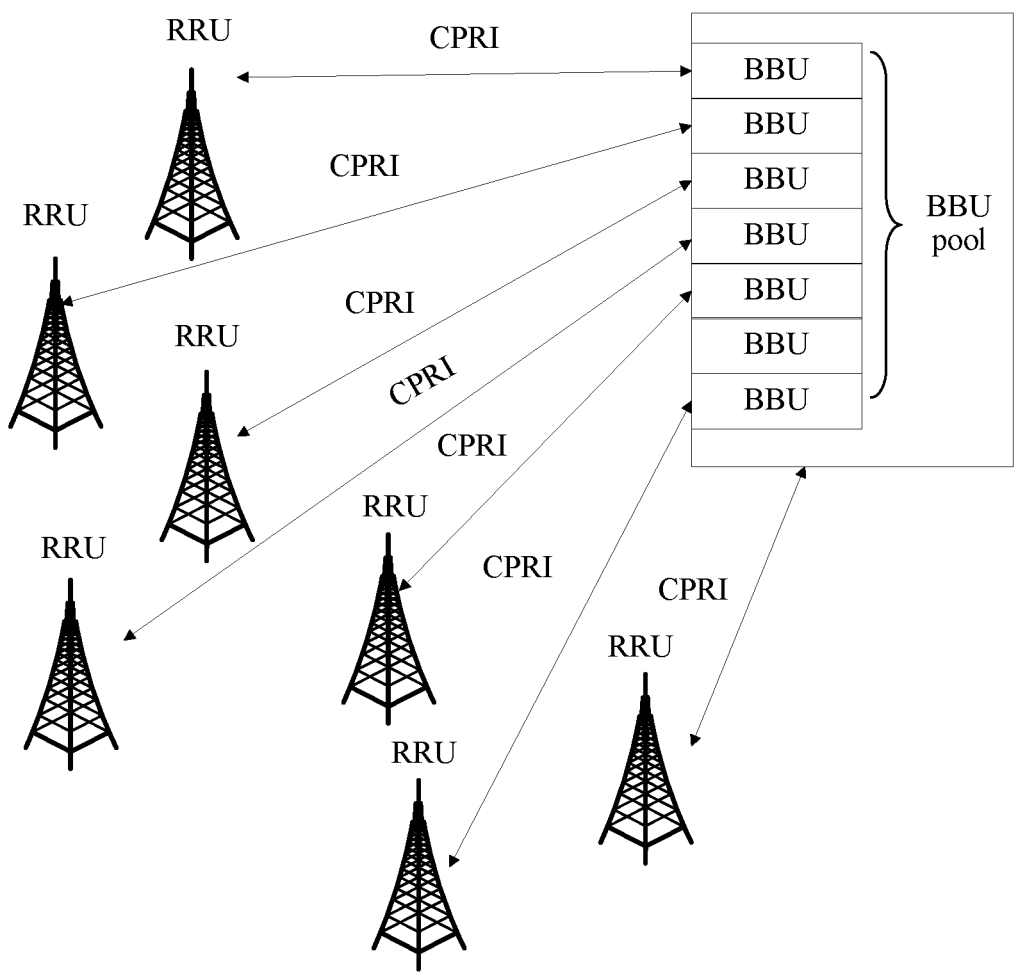
FIG. 1 is a schematic diagram of data transmission between a BBU side and an RRU side in the prior art.
Figure 2A:
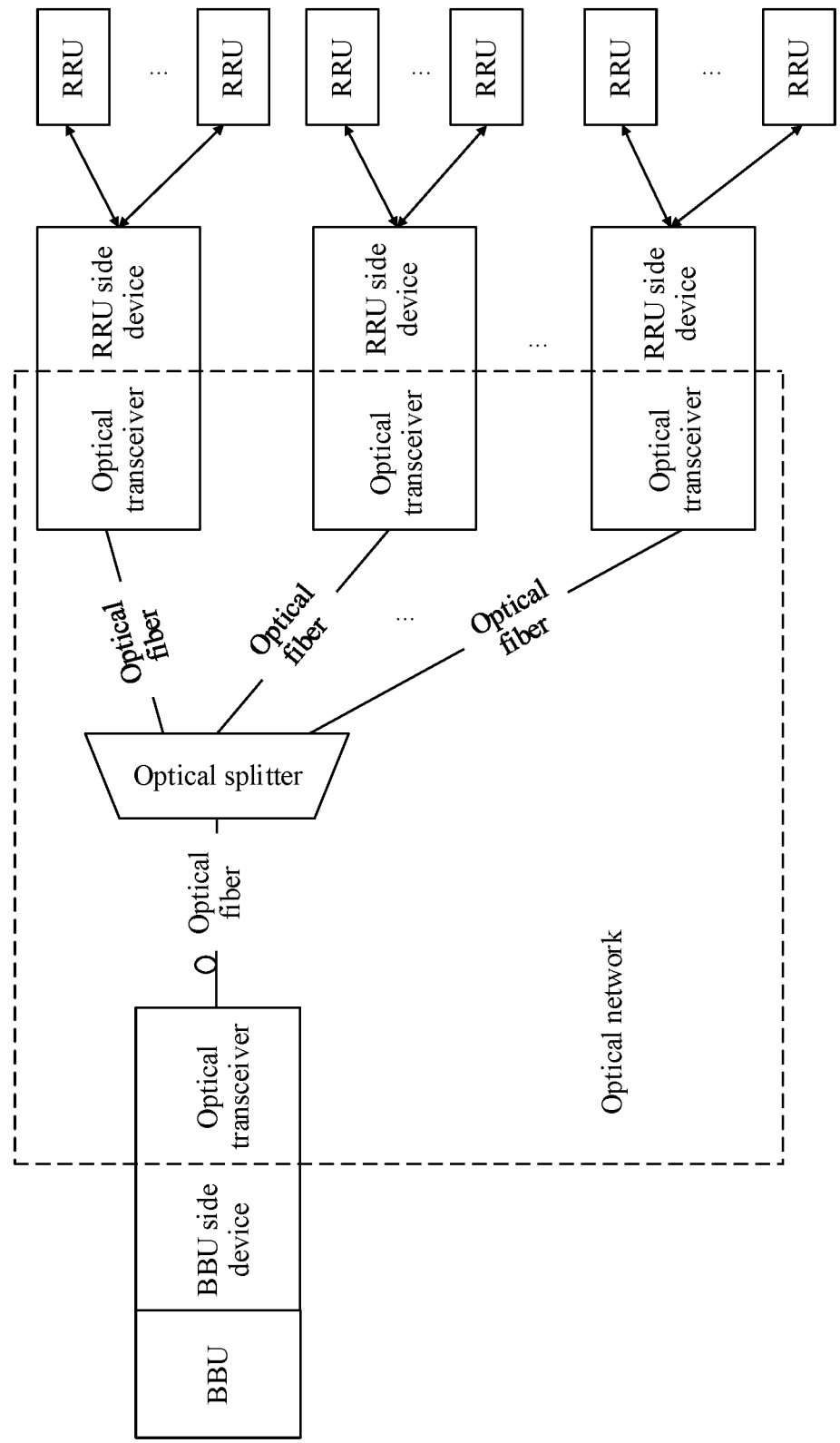
FIG. 2A and FIG. 2B are structural diagrams of wireless networks according to an embodiment of the present invention.
Figure 2B:
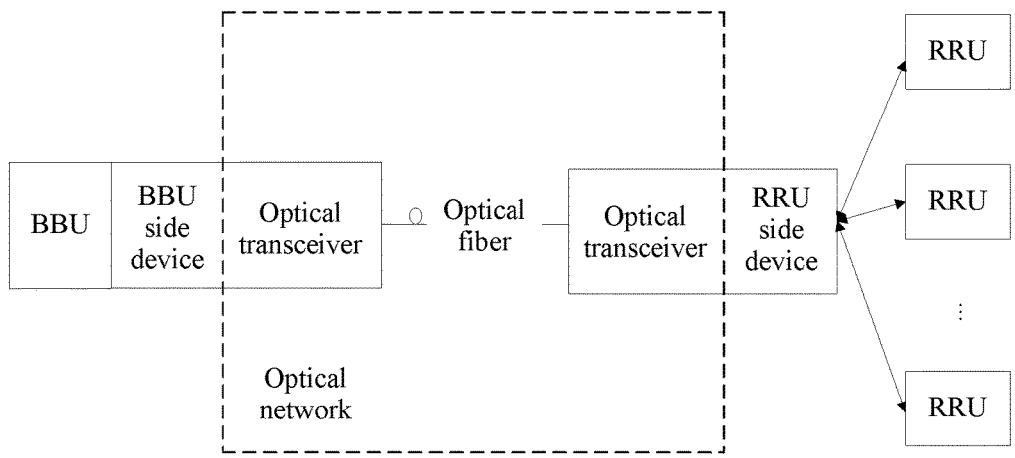

Referring to FIG. 2A and FIG. 2B, FIG. 2A and FIG. 2B are structural diagrams of two possible wireless networks according to an embodiment of the present invention. The wireless network includes a BBU, an RRU, a BBU side device, an RRU side device, and an optical network.

The optical network may be a passive optical network (PON), or may be an active optical network. It should be noted that, in this embodiment of the present invention, the PON is an optical network that includes a passive optical device, and does not relate to a PON transfer protocol in the prior art. For example, an optical splitter in FIG. 2A is a passive optical device. The active optical network is an optical network that includes an active optical device, and does not relate to an active optical network transfer protocol in the prior art. For example, the active optical device is an optical amplifier.

Specifically, in FIG. 2A, the optical network includes one optical transceiver on a BBU side, a plurality of optical transceivers on an RRU side, the optical splitter, and optical fibers. The optical transceiver on the BBU side is connected to one end of the optical splitter by using an optical fiber. The other end of the optical splitter is separately connected to the optical transceivers on the RRU side by using optical fibers. In FIG. 2B, the optical network includes one optical transceiver on a BBU side, one optical transceiver on an RRU side, and one optical fiber between the two optical transceivers. In actual application, another passive or active optical device may be further configured in the optical network. A person skilled in the art may perform configuration according to an actual requirement.

The optical transceiver and the BBU side device that are on the BBU side may be physically integrated together, or may be physically independent of each other. Similarly, the optical transceiver and the RRU side device that are on the RRU side may be physically integrated together, or may be physically independent of each other. In addition, the RRU side device and a corresponding RRU may be physically integrated together, or may be physically independent of each other.

The optical transceiver includes an optical transmitter and an optical receiver that are physically independent of each other or integrated together.

In actual application, if RRUs corresponding to a same BBU pool are relatively far away from each other, the network structure shown in FIG. 2A may be used. That is, at least two RRUs that are relatively close to each other are connected to a same RRU side device, and then a plurality of RRU side devices are connected to an optical splitter by using branch optical fibers, to connect to a BBU side device by using a trunk optical fiber. If RRUs corresponding to a same BBU pool are relatively close to each other, the network structure shown in FIG. 2B may be used. That is, all RRUs are connected to a same RRU side device, and the RRU side device is connected to a BBU side device by using an optical fiber. An electrical signal is transmitted between the RRU side device and the RRU.

In this embodiment of the present invention, that the BBU side device sends a signal to the RRU side device is referred to as downlink, and that the RRU side device sends a signal to the BBU side device is referred to as uplink.

Accordingly, the optical splitter is configured to: divide one downlink optical signal into a plurality of downlink optical signals, and separately transmit the plurality of downlink optical signals to the RRU side device; and import an uplink optical signal sent by the RRU side device into the trunk optical fiber, and transmit the uplink optical signal to the BBU side device.

In addition, in this embodiment of the present invention, the optical network may support multi-wavelength transmission. For example, downlink wavelengths include $\lambda_{11}$ to $\lambda_{1n}$, and n is an integer greater than or equal to 2. For example, uplink wavelengths include $\lambda_{21}$ to $\lambda_{2n}$.

Figure 3:
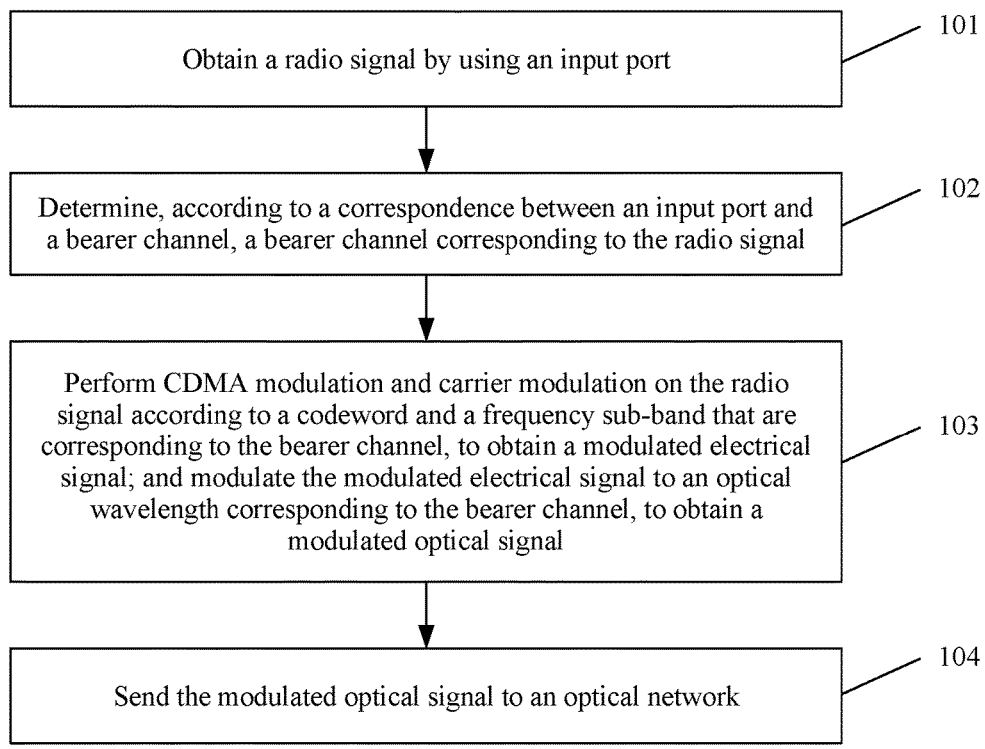
FIG. 3 is a flowchart of a data transmission method according to an embodiment of the present invention.

Then referring to FIG. 3, FIG. 3 is a flowchart of a data transmission method according to an embodiment of the present invention, and the method is described from a perspective of a data transmit end. In this embodiment, the method shown in FIG. 3 may be applied not only to the BBU side devices shown in FIG. 2A and FIG. 2B, but also to the RRU side devices shown in FIG. 2A and FIG. 2B. As shown in FIG. 3, the method includes:

Step 101: Obtain a radio signal by using an input port.

Step 102: Determine, according to a correspondence between an input port and a bearer channel, a bearer channel corresponding to the radio signal.

Step 103: Perform CDMA modulation and carrier modulation on the radio signal according to a codeword and a frequency sub-band that are corresponding to the bearer channel, to obtain a modulated electrical signal; and modulate the modulated electrical signal to an optical wavelength corresponding to the bearer channel, to obtain a modulated optical signal.

Step 104: Send the modulated optical signal to an optical network.

When the optical network supports only single-wavelength transmission, a same wavelength is used for all bearer channels. When the optical network supports multi-wavelength transmission, a same optical wavelength may be used for all bearer channels, or different optical wavelengths may be used for different bearer channels.

Optionally, if the codeword corresponding to the bearer channel is referred to as a first attribute of the bearer channel, and the frequency sub-band corresponding to the bearer channel is referred to as a second attribute of the bearer channel, and if only the first attribute and the second attribute of the bearer channel, that is, the codeword used for the bearer channel and the frequency sub-band of the bearer channel, are considered, a relationship between different bearer channels may have the following several cases. In Case 1, frequency sub-bands corresponding to all bearer channels are the same and are an entire frequency band supported by the optical network, and codewords corresponding to all the bearer channels are orthogonal to each other. That is, all radio signals are transmitted by using a same carrier, but all the radio signals are distinguished from each other by using orthogonal codewords. In Case 2, some of all bearer channels are corresponding to a same frequency sub-band, and the frequency sub-band is a part of a frequency band supported by the optical network; and codewords corresponding to the some bearer channels are orthogonal to each other. That is, the entire frequency band supported by the optical network may be divided into a plurality of frequency sub-bands, and the frequency sub-bands are distinguished from each other by using orthogonal codewords. Case 3 is similar to Case 2 but different from Case 2 in that, all bearer channels are corresponding to different frequency sub-bands, and the frequency sub-bands are a part of a frequency band supported by the optical network; and all the bearer channels are corresponding to different codewords.

In actual application, which one of Case 1 to Case 3 is specifically used may be set according to an actual case. The following uses an example to describe in detail how to determine the correspondence in step 102.

Figure 4:
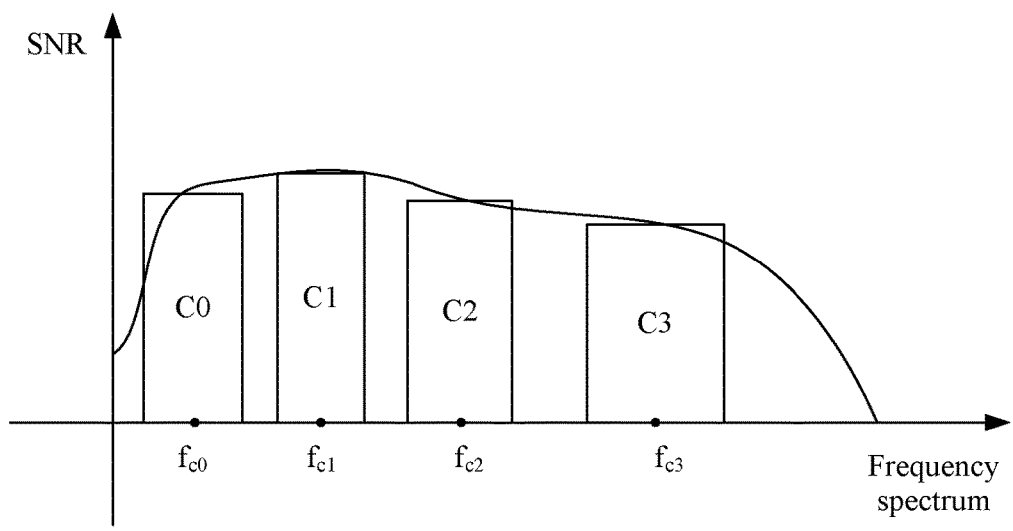
FIG. 4 is a diagram of a curve indicating how an SNR changes with a frequency spectrum according to an embodiment of the present invention.

Specifically, if a transmission medium and a frequency band of a signal are given, a channel capacity of the signal, that is, a maximum channel transmission rate is limited and satisfies a Shannon theorem. The following equation is used to represent the Shannon theorem: $Rmax=W*\log_2^{(1+SNR)}$. Rmax represents a channel capacity, W represents a frequency spectrum width of a channel, and SNR represents a signal-to-noise ratio (SNR) of the channel. Referring to FIG. 4, FIG. 4 is a diagram of a relationship between an SNR and a frequency spectrum. A longitudinal axis represents the SNR, a lateral axis represents the frequency spectrum, a curve indicates how the SNR changes with the frequency spectrum, and each rectangle, for example, a rectangle C0 represents a channel capacity. If the SNR is not large enough, a range of the frequency spectrum needs to be expanded, and therefore, the rectangle is wider. For example, a rectangle C3 is wider than a rectangle C1. Generally, because a channel capacity requirement of a given radio signal is determined, a channel capacity needs to be adjusted to satisfy the requirement. An adjustment method is to adjust a frequency spectrum width.

Before system startup, an administrator configures, on a BBU side, a current service type according to a current service configuration, including: configuring channel capacity requirements of a plurality of radio signals that currently need to be supported, that is, frequency spectrum width and SNR requirements and a quantity of each type of radio signals, and marks a service type for each radio signal input port. Generally, one service type is corresponding to one type of radio signals, and service types are in a one-to-one correspondence with types of radio signals. Each service type or each type of radio signals is corresponding to one channel capacity requirement, that is, one frequency spectrum width requirement and one SNR requirement.

For example, there are three types of currently supported radio signals: a first type of radio signals W1, a second type of radio signals W2, and a third type of radio signals W3. There are two radio signals W1: W11 and W12. There are three radio signals W2: W21, W22, and W23. There are two radio signals W3: W31 and W32. A frequency spectrum width of the radio signal W1 is F1, and an SNR requirement of the radio signal W1 is SNR 1. A frequency spectrum width of the radio signal W2 is F2, and an SNR requirement of the radio signal W2 is SNR 2. A frequency spectrum width of the radio signal W3 is F3, and an SNR requirement of the radio signal W3 is SNR 3.

After the system startup, downlink channel measurement and uplink channel measurement are performed to obtain SNR measurement results, that is, a curve indicating how a downlink SNR changes with a frequency spectrum and a curve indicating how an uplink SNR changes with a frequency spectrum. Specifically, a BBU side device sends a downlink reference signal to an RRU side device, and instructs, by using a management channel, the RRU side device to receive the reference signal, measure downlink channel quality by using the downlink reference signal, and then report an SNR measurement result to the BBU side device by using the management channel. Then the BBU side device instructs, by using the management channel, the RRU side device to send an uplink reference signal, and measures uplink channel quality to obtain an SNR measurement result. A specific measurement process is content well known to a person skilled in the art, and therefore, is not described herein.

It should be specially noted that a codeword and a carrier that are corresponding to the management channel are fixed. That is, the fixed carrier is used to perform carrier modulation on a signal sent by using the management channel and the fixed codeword is used to perform CDMA modulation on the signal sent by using the management channel, and the fixed carrier and the fixed codeword cannot be used for another bearer channel. In addition, an optical wavelength of the management channel may be all optical wavelengths or one optical wavelength in a multi-wavelength optical network.

After obtaining the measurement results, the BBU side device performs bear channel division and defines an attribute of a bearer channel according to a type of a radio signal, a quantity of radio signals, a channel capacity requirement of each type of radio signals, and a curve indicating how an SNR obtained by means of measurement changes with a frequency spectrum. If the BBU side device performs downlink bearer channel division and defines an attribute of a downlink bearer channel, the BBU side device uses the curve indicating how the downlink SNR changes with the frequency spectrum. If the BBU side device performs uplink bearer channel division and defines an attribute of an uplink bearer channel, the BBU side device uses the curve indicating how the uplink SNR changes with the frequency spectrum.

In actual application, alternatively, the system administrator may perform bearer channel division and define an attribute of a bearer channel.

Specifically, the type of the radio signal may be corresponding to a frequency sub-band (including a carrier location and a frequency spectrum width). Therefore, a downlink frequency band or an uplink frequency band supported by the optical network may be divided according to the type of the radio signal. A frequency band except the fixed carrier occupied by the management channel may be divided into frequency sub-bands of a quantity that is consistent with that of types. A width of a frequency sub-band corresponding to each type may be determined according to the channel capacity requirement of each type of radio signals. Therefore, frequency sub-bands may be the same or may be different. For example, if the frequency spectrum width required by the first type of radio signals W1 is F1, and the SNR requirement is SNR 1, a channel capacity of the first type of radio signals W1 may be calculated according to the Shannon's equation. It is assumed that the channel capacity of the first type of radio signals W1 is R1. Generally, to keep a specific channel capacity margin, a final channel capacity of the first type of radio signals W1 is R1+r, and r is greater than 0. Assuming that an actual SNR obtained by means of measurement is SNRc, it may be finally determined, according to the Shannon's equation, that a frequency spectrum width of a frequency sub-band occupied by the first type of radio signals W1 is a result obtained by dividing (R1+r) by $\log_2^{(1+SNRc)}$. For another example, SNRc is 8 dB smaller than SNR 1. Theoretically, CDMA spread spectrum can provide a specific gain, and the CDMA spread spectrum can compensate for the difference. For example, theoretically, 16-times spread spectrum can provide a gain of approximately 12 dB. If only one of the two radio signals W11 and W12 in the first type of radio signals W1 is transmitted on the frequency sub-band, a frequency spectrum width occupied by the frequency sub-band is F1*16, and a codeword length is 16. If the two radio signals are transmitted on the frequency sub-band, 64-times spread spectrum can provide an 18 dB gain, and in this case, each radio signal has a 9 dB gain. Therefore, an SNR requirement of each radio signal can be satisfied. In this case, a frequency spectrum width occupied by the frequency sub-band is F1*64, and a codeword length is 64.

A plurality of radio signals in each type of radio signals may be corresponding to a group of codewords, and the group of codewords are orthogonal to each other and have a same length. The plurality of radio signals in each type of radio signals require a same channel capacity, and therefore, may be corresponding to one codeword group.

The foregoing example is still used for description. The first type of radio signals W1 is corresponding to a first frequency sub-band C1, the second type of radio signals W2 is corresponding to a second frequency sub-band C2, and the third type of radio signals W3 is corresponding to a third frequency sub-band C3. A codeword corresponding to the radio signal W11 is code 1, and a codeword corresponding to the radio signal W12 is code 2, where code 1 and code 2 have a same length and are orthogonal to each other. A codeword corresponding to the radio signal W21 is code 3, a codeword corresponding to the radio signal W22 is code 4, and a codeword corresponding to the radio signal W23 is code 5, where code 3, code 4, and code 5 have a same length and are orthogonal to each other. A codeword corresponding to the radio signal W31 is code 6, and a codeword corresponding to the radio signal W32 is code 7.

After the foregoing process, seven bearer channels may be obtained by means of division. Each bearer channel includes two attributes: a codeword used for the bearer channel and a frequency sub-band of the bearer channel. Table 1 is an attribute table of the seven bearer channels.

TABLE 1

| Bearer channel ID | Codeword | Frequency sub-band |
|---|---|---|
| 1 | Code 1 | C1 |
| 2 | Code 2 | C1 |
| 3 | Code 3 | C2 |
| 4 | Code 4 | C2 |
| 5 | Code 5 | C2 |
| 6 | Code 6 | C3 |
| 7 | Code 7 | C3 |

Third attributes of the bearer channels, that is, optical wavelengths of the bearer channels, may be usually allocated according to a quantity of optical wavelengths and a quantity of bearer channels, or a same wavelength may be used for all the bearer channels. Specifically, assuming that there are seven bearer channels, and there are eight optical wavelengths supported by the optical network, one optical wavelength may be allocated to each bearer channel. If there are eight bearer channels, and there are seven optical wavelengths, there may be two bearer channels with a same optical wavelength, and one of the other six optical wavelengths is used for each of the other bearer channels.

Then mapping is performed between a bearer channel identifier (ID) and each radio signal input port to form a mapping table. The mapping table is a specific storage form of the foregoing correspondence between an input port and a bearer channel.

Because each wireless input port represents one service type, that is, represents one type of radio signals, a correspondence between each wireless input port and each bearer channel may be considered as a correspondence between each radio signal input from the wireless input port and each bearer channel.

For example, a form of the mapping table is shown in Table 2.

TABLE 2

| Radio signal input port | Radio signal | Bearer channel ID |
|---|---|---|
| Port 1 | W11 | 1 |
| Port 2 | W12 | 2 |
| Port 3 | W21 | 3 |
| Port 4 | W22 | 4 |
| Port 5 | W23 | 5 |
| Port 6 | W31 | 6 |
| Port 7 | W32 | 7 |

A column in which the radio signal is located may not exist in an actual mapping table, and in this specification, the column exists only to facilitate description of a correspondence between a bearer channel and each of a radio signal and an input port.

Therefore, when the radio signal is received by using the input port, for example, the radio signal W11 is received by using an input port port 1, it may be determined, according to the correspondence (for example, as shown in Table 2) between an input port and a bearer channel, that a bearer channel corresponding to the radio signal is a bearer channel 1. According to predefined attributes (for example, as shown in Table 1) of the bearer channel 1, the attributes of the bearer channel 1 include a codeword used for the bearer channel 1: code 1, a frequency sub-band of the bearer channel 1: a frequency sub-band C1, and an optical wavelength: a first optical wavelength.

Then CDMA modulation is performed on the radio signal W11 according to the codeword code 1, and carrier modulation is performed on the radio signal W11 according to the frequency sub-band C1, to obtain a modulated electrical signal. Then the modulated electrical signal is modulated to the first optical wavelength, to obtain a modulated optical signal.

It can be learned from the foregoing description that different-codewords-based CDMA modulation and different carrier modulation are performed on each radio signal, to obtain a modulated electrical signal, and then the modulated electrical signal is modulated to an optical wavelength supported by the optical network, to obtain a modulated optical signal, so that a quantity of deployed optical fibers between a BBU side and an RRU side can be greatly reduced. In addition, because there is no need to encapsulate the radio signal, system transmission efficiency is improved.

Further, because the bearer channel in this embodiment of the present invention is determined according to the type of the radio signal, the quantity of radio signals, the channel capacity requirement of each type of radio signals, and the curve indicating how the actual SNR obtained by means of measurement changes with the frequency spectrum, bearer channels that satisfy SNR requirements of different radio signals can be provided for the different radio signals. That is, the solution in this embodiment of the present invention provides a reliable fronthaul bearer channel.

The example of defining the bearer channel is described above. In actual application, another manner may be used to define the bearer channel, provided that the bearer channel includes the foregoing three attributes and two bearer channels are different from each other in terms of at least one attribute. This is not specifically limited in the present invention. For example, at least one bearer channel is directly determined according to a type of a radio signal, a quantity of radio signals, and a channel capacity requirement of each type of radio signals, where attributes of each bearer channel include a codeword used for the bearer channel, a frequency sub-band of the bearer channel, and an optical wavelength of the bearer channel; and then the correspondence between each input port and the at least one bearer channel is generated.

Optionally, if the correspondence is a correspondence between an input port and an uplink bearer channel, the BBU side device may further send the correspondence to the RRU side device, so that the RRU side device determines a bearer channel of an uplink radio signal. Further, the BBU side device may send a correspondence between an input port and a downlink bearer channel to the RRU side device, so that the RRU side device can demodulate a signal based on the correspondence.

Specifically, the BBU side device sends the correspondence to the RRU side device by using the management channel.

In actual application, the method in this embodiment of the present invention may be used to transmit an analog signal, or may be used to transmit a digital signal. The following uses an example to describe an implementation process of the data transmission method in this embodiment of the present invention.

When radio signals are digital signals existing before quadrature modulation, for example, include two digital signals I and Q, it may be considered that two radio signals are input from two input ports.

In step 102, a corresponding bearer channel is determined for each of the two digital signals, and then step 103 is performed, that is, the two digital signals are modulated according to attribute information of respective bearer channels, to obtain two modulated optical signals. Then step 104 is performed, that is, the two modulated optical signals are sent in the optical network.

Optionally, codewords of the two bearer channels corresponding to the two digital signals are orthogonal to each other. CDMA modulation is performed on the two signals, and then signals obtained after the CDMA modulation are converted, by using a digital-to-analog converter (DAC), to an analog domain for carrier modulation, to obtain two modulated electrical signals. Then the modulated electrical signals are modulated to optical wavelengths of the bearer channels.

A case in which a radio signal is a digital signal obtained after quadrature modulation is the same as that of the foregoing digital radio signal, and a case in which a radio signal is an analog signal is the same as that of the foregoing digital radio signal except that no DAC conversion is required. Therefore, details are not described herein again.

The implementation process of the data transmit end is described above, and a data receive end performs a reverse operation of the transmit end. Specifically, the data receive end restores a received optical signal to an electrical signal; performs filtering and frequency modulation to obtain a baseband signal, that is, obtains the signal from a carrier by means of demodulation; then performs CDMA demodulation; and then outputs, from a corresponding output port, a first radio signal obtained by means of demodulation to a corresponding RRU.

Specifically, one signal ID may be allocated to each radio signal, and both an input port for inputting each radio signal and an output port for outputting each radio signal are predetermined. The BBU side device and the RRU side device may interact with each other by using the management channel, and send each radio signal to each other by using a corresponding input port and output port, so that when obtaining a radio signal by means of demodulation, the receive end can output, from a corresponding output port, the radio signal to a corresponding RRU according to a correspondence between a signal ID and an output port. Certainly, because input ports are in a correspondence with output ports, a relationship between the output port and the bearer channel may be added to the foregoing correspondence. Therefore, the receive end may output, according to the correspondence between an output port and a bearer channel from an output port corresponding to a bearer channel, a radio signal obtained after CDMA demodulation, so as to implement communication between the BBU and the RRU.

Figure 5:
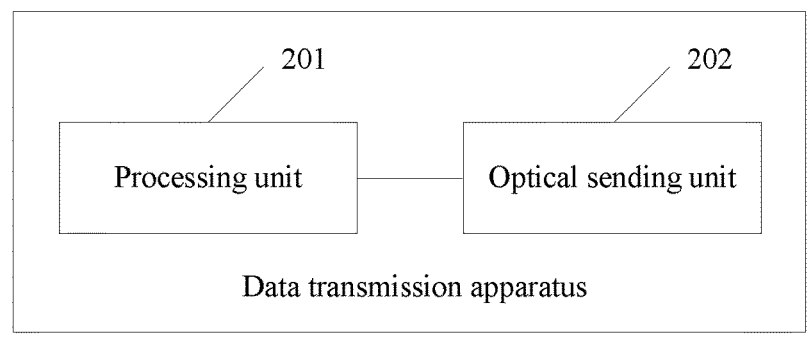
FIG. 5 is a functional block diagram of a data transmission apparatus according to an embodiment of the present invention.

Based on a same invention concept, an embodiment of the present invention further provides a data transmission apparatus to implement the method shown in FIG. 3. As shown in FIG. 5, the data transmission apparatus includes: a processing unit 201, configured to: obtain a radio signal by using an input port; determine, according to a correspondence between an input port and a bearer channel, a bearer channel corresponding to the radio signal; and perform CDMA modulation on the radio signal according to a codeword corresponding to the bearer channel and perform carrier modulation on the radio signal according to a frequency sub-band of the bearer channel, to obtain a modulated electrical signal; and modulate the modulated electrical signal to an optical wavelength corresponding to the bearer channel, to obtain a modulated optical signal; and an optical sending unit 202, configured to send the modulated optical signal to an optical network.

Optionally, the processing unit 201 is configured to: measure a channel, to obtain information indicating how an SNR changes with a frequency spectrum; determine at least one bearer channel according to a configured type of a radio signal, a configured quantity of each type of radio signals, a configured channel capacity requirement of each type of radio signals, and the information indicating how the SNR changes with the frequency spectrum; and generate the correspondence between each input port and the at least one bearer channel.

Optionally, the processing unit 201 is configured to: determine at least one bearer channel according to a configured type of a radio signal, a configured quantity of each type of radio signals, and a configured channel capacity requirement of each type of radio signals; and generate the correspondence between each input port and the at least one bearer channel.

Optionally, the optical sending unit 202 is further configured to: send a reference signal; and receive, by using a management channel, a measurement result generated based on the reference signal, where a codeword and a carrier that are used for the management channel are fixed.

The processing unit 201 is further configured to determine, according to the measurement result, the information indicating how the SNR changes with the frequency spectrum.

Optionally, the optical sending unit 202 is further configured to send the correspondence to a receive end by using a management channel, so that the receive end demodulates the modulated optical signal according to the correspondence, where a codeword and a carrier that are used for the management channel are fixed.

Optionally, the apparatus further includes an optical receiving unit, configured to receive the correspondence by using a management channel, where a codeword and a carrier that are used for the management channel are fixed.

Various variations and specific instances in the data transmission method in the foregoing embodiment shown in FIG. 3 are also applicable to the data transmission apparatus in this embodiment. With the foregoing detailed descriptions of the data transmission method, a person skilled in the art can clearly understand an implementation of the data transmission apparatus in this embodiment. Therefore, for conciseness of the specification, details are not described herein again.

Figure 6:
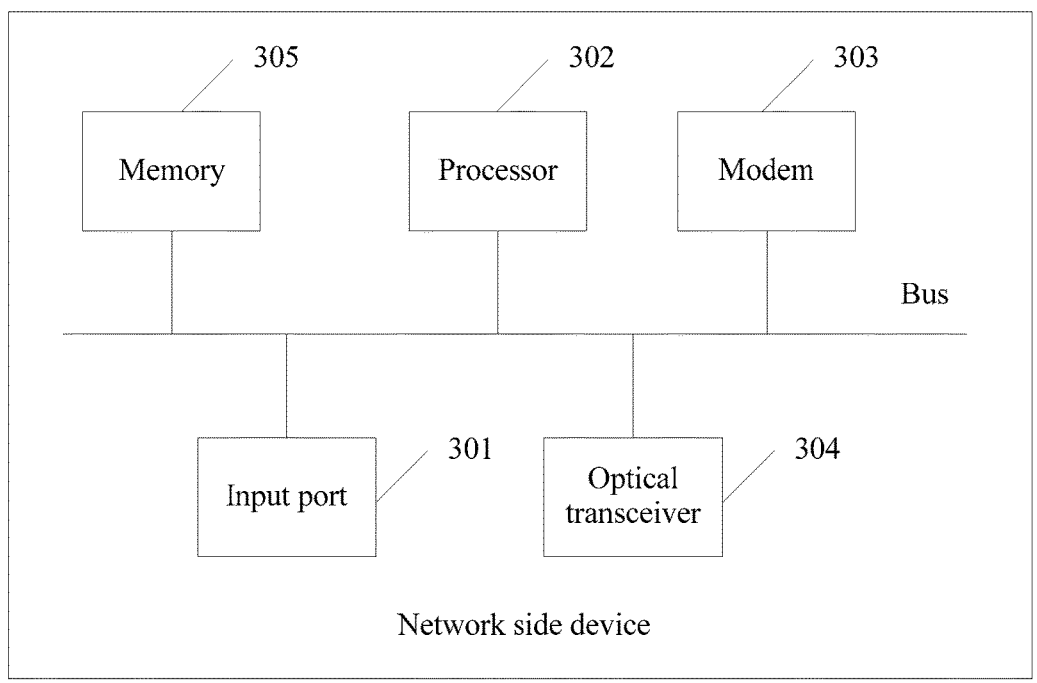
FIG. 6 is a structural block diagram of a network side device according to an embodiment of the present invention.

Based on a same invention concept, an embodiment of the present invention further provides a network side device to implement the method shown in FIG. 3. As shown in FIG. 6, the network side device includes an input port 301, a processor 302, a modem 303, an optical transceiver 304, and a memory 305. The processor 302 may be specifically a central processing unit or an application-specific integrated circuit (ASIC), or may be one or more integrated circuits configured to control program execution, or may be a hardware circuit developed by using a field programmable gate array (FPGA). There may be one or more memories 305. The memory 305 may include a read-only memory (ROM), a random access memory RAM), and a magnetic disk storage. The optical transceiver 304 may include an optical receiver and an optical transmitter that are physically independent of each other or integrated together. There may be one or more input ports 301.

Specifically, the input port 301 is configured to receive a radio signal. The processor 302 is configured to determine, according to a correspondence between an input port and a bearer channel, a bearer channel corresponding to the radio signal. The modem 303 is configured to: perform CDMA modulation and carrier modulation on the radio signal according to a codeword and a frequency sub-band that are corresponding to the bearer channel, to obtain a modulated electrical signal; and modulate the modulated electrical signal to an optical wavelength corresponding to the bearer channel, to obtain a modulated optical signal, where the optical wavelength is an optical wavelength supported by an optical network that connects the network side device and a receive end device. The optical transceiver 304 is configured to send the modulated optical signal to the optical network.

Optionally, the processor 302 is further configured to: obtain a measurement result of a channel, where the measurement result includes information indicating how an SNR changes with a frequency spectrum; determine at least one bearer channel according to a configured type of a radio signal, a configured quantity of each type of radio signals, a configured channel capacity requirement of each type of radio signals, and the information indicating how the SNR changes with the frequency spectrum; and generate the correspondence between each input port and the at least one bearer channel.

Optionally, the processor 302 is further configured to: determine at least one bearer channel according to a configured type of a radio signal, a configured quantity of each type of radio signals, and a configured channel capacity requirement of each type of radio signals; and generate the correspondence between each input port and the at least one bearer channel.

Optionally, the optical transceiver 304 is further configured to: send a reference signal to the receive end device; and receive, by using a management channel, a measurement result generated based on the reference signal, where a codeword and a carrier that are used for the management channel are fixed.

The processor 302 is configured to obtain, according to the measurement result, the information indicating how the SNR changes with the frequency spectrum.

Optionally, the optical transceiver 304 is further configured to send the correspondence to the receive end device by using a management channel, so that the receive end device demodulates the modulated optical signal according to the correspondence, where a codeword and a carrier that are used for the management channel are fixed.

Optionally, the optical transceiver 304 is further configured to receive the correspondence by using a management channel, where a codeword and a carrier that are used for the management channel are fixed.

Optionally, the network side device is a BBU side device, and the receive end device is an RRU side device; or the network side device is an RRU side device, and the receive end device is a BBU side device.

Various variations and specific instances in the data transmission method in the foregoing embodiment shown in FIG. 3 are also applicable to the network side device in this embodiment. With the foregoing detailed descriptions of the data transmission method, a person skilled in the art can clearly understand an implementation of the network side device in this embodiment. Therefore, for conciseness of the specification, details are not described herein again.

One or more technical solutions provided in the embodiments of this application have at least the following technical effects or advantages:

Each input port is corresponding to one bearer channel, and each bearer channel includes three attributes: a codeword used for each bearer channel, a frequency sub-band of each bearer channel, and an optical wavelength of each bearer channel. Then different-codewords-based CDMA modulation and different carrier modulation are performed on each radio signal, to obtain a modulated electrical signal, and then the modulated electrical signal is modulated to an optical wavelength supported by an optical network, to obtain a modulated optical signal. Because there is no need to encapsulate the radio signal, and an amount of to-be-transmitted invalid data is reduced, system transmission efficiency is improved. Further, because radio signals are distinguished from each other by using codewords and/or carriers, one separate optical fiber is optional between an RRU and a BBU, on the premise that at least only one optical fiber is required in an entire network. Therefore, a quantity of deployed optical fibers between a BBU side and an RRU side can be greatly reduced.

Obviously, a person skilled in the art can make various modifications and variations to the present invention without departing from the spirit and scope of the present invention.

The present invention is intended to cover these modifications and variations provided that they fall within the scope of protection defined by the following claims and their equivalent technologies.

What is claimed is:

1. A data transmission method, comprising:
   determining at least one bearer channel according to a configured type of a radio signal, a configured quantity of each type of radio signals, and a configured channel capacity requirement of each type of radio signals;
   establishing a correspondence between an input port and a bearer channel;
   obtaining a radio signal by an input port;
   determining, based on the correspondence between an input port and a bearer channel, a bearer channel corresponding to the radio signal;
   performing Code Division Multiple Access (CDMA) modulation and carrier modulation on the radio signal according to a codeword and a frequency sub-band corresponding to the bearer channel to obtain a modulated electrical signal;
   modulating the modulated electrical signal to an optical wavelength corresponding to the bearer channel to obtain a modulated optical signal; and
   sending the modulated optical signal to an optical network.

2. The method according to claim 1, wherein the method further comprises:
   measuring a channel to obtain information indicating how a signal-to-noise ratio (SNR) changes with a frequency spectrum;
   determining at least one bearer channel according to the information indicating how the SNR changes with the frequency spectrum; and
   establishing the correspondence between an input port and a bearer channel.

3. The method according to claim 1, wherein the method further comprises:
   sending the correspondence to a receive end by a management channel, wherein the receive end demodulates the modulated optical signal according to the correspondence, wherein a codeword and a carrier used for the management channel are fixed.

4. The method according to claim 1, wherein the method further comprises:
   receiving the correspondence by a management channel, wherein a codeword and a carrier used for the management channel are fixed.

5. The method according to claim 2, wherein measuring the channel comprises:
   sending a reference signal;
   receiving, using a management channel, a measurement result generated based on the reference signal, wherein a codeword and a carrier used for the management channel are fixed; and
   determining, according to the measurement result, the information indicating how the SNR changes with the frequency spectrum.

6. A network side device, comprising:
   an input port, the input port configured to receive a radio signal;
   at least one processor, the at least one processor configured to determine, based on a correspondence between an input port and a bearer channel, a bearer channel corresponding to the radio signal, wherein the bearer channel is associated with a codeword, a frequency sub-band, and an optical wavelength;
   a modem, the modem configured to:
      perform Code Division Multiple Access (CDMA) modulation and carrier modulation on the radio signal according to the codeword and the frequency sub-band corresponding to the bearer channel to obtain a modulated electrical signal, wherein the CDMA modulation is performed according to the codeword associated with the bearer channel, and wherein the carrier modulation is performed according to the frequency sub-band associated with the bearer channel; and
      modulate the modulated electrical signal to the optical wavelength associated with the bearer channel to obtain a modulated optical signal, wherein the optical wavelength is an optical wavelength supported by an optical network that connects the network side device and a receive end device; and
   an optical transceiver, the optical transceiver configured to send the modulated optical signal to the optical network.

7. The network side device according to claim 6, wherein the at least one processor is further configured to:
   obtain a measurement result of a channel, wherein the measurement result comprises information indicating how a signal-to-noise ratio (SNR) changes with a frequency spectrum;
   determine at least one bearer channel according to the information indicating how the SNR changes with the frequency spectrum; and
   establish the correspondence between an input port and a bearer channel.

8. The network side device according to claim 6, wherein the at least one processor is further configured to:
   determine at least one bearer channel according to a configured type of a radio signal, a configured quantity of each type of radio signals, and a configured channel capacity requirement of each type of radio signals; and
   establish the correspondence between an input port and a bearer channel.

9. The network side device according to claim 6, wherein the optical transceiver is further configured to send the correspondence to the receive end device by a management channel, wherein the receive end device demodulates the modulated optical signal according to the correspondence, and wherein a codeword and a carrier used for the management channel are fixed.

10. The network side device according to claim 6, wherein the optical transceiver is further configured to receive the correspondence by a management channel, wherein a codeword and a carrier used for the management channel are fixed.

11. The network side device according to claim 6, wherein:
    the network side device is a baseband unit (BBU) side device, and the receive end device is a remote radio unit (RRU) side device; or
    the network side device is a RRU side device, and the receive end device is a BBU side device.

12. The network side device according to claim 7, wherein:
    the optical transceiver is further configured to:
       send a reference signal to the receive end device; and
       receive, by a management channel, a measurement result generated based on the reference signal, wherein a codeword and a carrier used for the management channel are fixed; and the at least one processor is configured to:
obtain, according to the measurement result, the information indicating how the SNR changes with the frequency spectrum.

13. A data transmission method, comprising:
obtaining a radio signal by an input port;
determining, based on a correspondence between an input port and a bearer channel, a bearer channel corresponding to the radio signal, wherein the bearer channel is associated with a codeword, a frequency sub-band, and an optical wavelength;
performing Code Division Multiple Access (CDMA) modulation and carrier modulation on the radio signal according to the codeword and the frequency sub-band corresponding to the bearer channel to obtain a modulated electrical signal, wherein the CDMA modulation is performed according to the codeword associated with the bearer channel, and wherein the carrier modulation is performed according to the frequency sub-band associated with the bearer channel;
modulating the modulated electrical signal to the optical wavelength associated with the bearer channel to obtain a modulated optical signal; and
sending the modulated optical signal to an optical network.

14. The method according to claim 13, wherein the method further comprises:
measuring a channel to obtain information indicating how a signal-to-noise ratio (SNR) changes with a frequency spectrum;
determining at least one bearer channel according to the information indicating how the SNR changes with the frequency spectrum; and
establishing the correspondence between an input port and a bearer channel.

15. The method according to claim 13, wherein the method further comprises:
sending the correspondence to a receive end by a management channel, wherein the receive end demodulates the modulated optical signal according to the correspondence, wherein a codeword and a carrier used for the management channel are fixed.

16. The method according to claim 13, wherein the method further comprises:
receiving the correspondence by a management channel, wherein a codeword and a carrier used for the management channel are fixed.

17. The method according to claim 14, wherein measuring the channel comprises:
sending a reference signal;
receiving, using a management channel, a measurement result generated based on the reference signal, wherein a codeword and a carrier used for the management channel are fixed; and
determining, according to the measurement result, the information indicating how the SNR changes with the frequency spectrum.

* * * * *